(12) United States Patent
Kinoshita et al.

(10) Patent No.: US 12,235,227 B2
(45) Date of Patent: Feb. 25, 2025

(54) X-RAY INSPECTION APPARATUS

(71) Applicant: JED CO., LTD, Azumino (JP)

(72) Inventors: Osamu Kinoshita, Azumino (JP); Toshihiko Miyairi, Azumino (JP)

(73) Assignee: JED Co., Ltd. (JP)

( * ) Notice: Subject to any disclaimer, the term of this patent is extended or adjusted under 35 U.S.C. 154(b) by 205 days.

(21) Appl. No.: 17/924,194

(22) PCT Filed: Oct. 7, 2021

(86) PCT No.: PCT/JP2021/037106
§ 371 (c)(1),
(2) Date: Nov. 9, 2022

(87) PCT Pub. No.: WO2022/107476
PCT Pub. Date: May 27, 2022

(65) Prior Publication Data
US 2023/0175987 A1 Jun. 8, 2023

(30) Foreign Application Priority Data
Nov. 18, 2020 (JP) ................................. 2020-191471

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/04* (2013.01); *G01N 2223/33* (2013.01); *G01N 2223/419* (2013.01)

(58) Field of Classification Search
CPC ............... G01N 23/046; G01N 23/223; G01N 2223/3306; G01N 2223/401;
(Continued)

(56) References Cited

U.S. PATENT DOCUMENTS 10,627,353 B2    4/2020 Kinoshita
2004/0013225 A1*  1/2004 Gregerson ........... A61B 6/4405
                                                378/19
(Continued)

FOREIGN PATENT DOCUMENTS

JP    H11-344453 A    12/1999
JP    2004-117024 A    4/2004
WO    2017-203886 A1   11/2017

OTHER PUBLICATIONS

European Search Report issued in the corresponding European Patent Application No. 21894351.2; dated May 6, 2024 (total 9 pages).

(Continued)

*Primary Examiner* — Irakli Kiknadze
(74) *Attorney, Agent, or Firm* — Harness, Dickey & Pierce, P.L.C.

(57) ABSTRACT

In an X-ray inspection apparatus, an X-ray detector starts to acquire an X-ray image before a motor is started and outputs a periodic acquisition timing signal of the X-ray image, a generation circuit control unit generates a motor start signal based on a first signal generated from the acquisition timing signal, and a start signal generation circuit generates and outputs a controller start signal to a controller at an output timing of the acquisition timing signal after receiving the motor start signal. A CT image is generated based on a plurality of the X-ray images that are acquired after a rotation speed of the motor reaches a fixed speed.

12 Claims, 8 Drawing Sheets

(58) Field of Classification Search
CPC .......... G01N 2223/419; G01N 23/083; G01N 23/04; G01N 2223/50; G01N 2223/04; G01N 2223/33; G01N 2223/3303; G01N 23/18; G01V 5/226; G01V 5/22; G01V 5/0016; G01V 5/005; G01T 1/244; G01T 1/247; G01T 1/241; G01T 1/29; H05G 1/08
USPC ................................................ 378/4, 19, 62
See application file for complete search history.

(56) References Cited

U.S. PATENT DOCUMENTS

| 2004/0081274 | A1 | 4/2004 | Kresse et al. | |
| 2016/0313454 | A1 | 10/2016 | Rodrigues et al. | |
| 2017/0356859 | A1* | 12/2017 | Sugita | G01N 23/046 |
| 2018/0120242 | A1* | 5/2018 | Takahashi | G01B 21/042 |
| 2020/0088655 | A1* | 3/2020 | Nakayama | G01N 3/08 |

OTHER PUBLICATIONS

International Search Report (English and Japanese) issued in PCT/JP2021/037106, mailed Dec. 21, 2021; ISA/JP (6 pages).

\* cited by examiner

X-RAY INSPECTION APPARATUS

CROSS REFERENCE TO RELATED APPLICATIONS

This application is a U.S. National Phase Application under 35 U.S.C. 371 of International Application No. PCT/JP2021/037106, filed on Oct. 7, 2021, which claims priority to Japanese Patent Application No. 2020-191471, filed on Nov. 18, 2020. The entire disclosures of the above applications are expressly incorporated by reference herein.

FIELD

The present invention relates to an X-ray inspection apparatus for nondestructively inspecting an inner part of an industrial product and the like.

BACKGROUND

In the related art, there is known an X-ray inspection apparatus for nondestructively inspecting an inner part of an object to be inspected such as an industrial product (for example, refer to WO2017/203886). The X-ray inspection apparatus according to WO2017/203886 includes an X-ray generator that emits X-rays to an object to be inspected, an area sensor (two-dimensional X-ray detector) that is placed to be opposed to the X-ray generator across the object to be inspected, a table on which the object to be inspected is mounted, a rotation mechanism that rotates the table, and a movement mechanism that translates the area sensor. The object to be inspected that is inspected by the X-ray inspection apparatus is relatively large. Thus, with this X-ray inspection apparatus, when the area sensor is moved to nine placement positions including a first placement position to a ninth placement position, the area sensor can acquire an X-ray image of the entire object to be inspected.

When the object to be inspected is inspected by the X-ray inspection apparatus according to WO2017/203886, first, the area sensor is moved to and stopped at the first placement position. In this state, the object to be inspected is rotated once at a fixed speed, and a plurality of X-ray images are continuously acquired by the area sensor per fixed angle. Thereafter, the area sensor is moved to and stopped at a second placement position. In this state, the object to be inspected is rotated once at a fixed speed, and a plurality of X-ray images are continuously acquired by the area sensor per fixed angle. Thereafter, the area sensor is moved to and stopped at a third placement position. In this state, the object to be inspected is rotated once at a fixed speed, and a plurality of X-ray images are continuously acquired by the area sensor per fixed angle. Thereafter, the area sensor is successively moved to and stopped at a fourth placement position to the ninth placement position. In this state, the object to be inspected is rotated once at a fixed speed, and a plurality of X-ray images are continuously acquired by the area sensor per fixed angle.

The X-ray inspection apparatus according to WO2017/203886 generates a composite X-ray image by connecting and compositing X-ray images that are acquired when the area sensor is placed at the first placement position, the second placement position, and the third placement position, and acquired at the same angle in a relative rotation direction of the area sensor with respect to the object to be inspected. Similarly, this X-ray inspection apparatus generates a composite X-ray image by connecting and compositing X-ray images that are acquired when the area sensor is placed at the fourth placement position, a fifth placement position, and a sixth placement position, and acquired at the same angle in the relative rotation direction of the area sensor with respect to the object to be inspected.

Furthermore, this X-ray inspection apparatus generates a composite X-ray image by connecting and compositing X-ray images that are acquired when the area sensor is placed at a seventh placement position, an eighth placement position, and the ninth placement position, and acquired at the same angle in the relative rotation direction of the area sensor with respect to the object to be inspected. Thereafter, this X-ray inspection apparatus performs predetermined processing on the composite X-ray image, and performs a predetermined arithmetic operation based on the composite X-ray image after the processing to generate a CT image.

In a case in which the X-ray inspection apparatus according to WO2017/203886 generates, for example, a composite X-ray image by connecting an X-ray image A1 that is acquired when the area sensor is placed at the first placement position (that is, the X-ray image A1 acquired at the time of the first rotation of the object to be inspected), an X-ray image B1 that is acquired when the area sensor is placed at the second placement position (that is, the X-ray image B1 acquired at the time of the second rotation of the object to be inspected), and an X-ray image C1 that is acquired when the area sensor is placed at the third placement position (that is, the X-ray image C1 acquired at the time of the third rotation of the object to be inspected), if there are variations in an angle of the object to be inspected in the relative rotation direction of the area sensor with respect to the object to be inspected at the time when the X-ray image A1 is acquired, an angle of the object to be inspected in the relative rotation direction of the area sensor with respect to the object to be inspected at the time when the X-ray image B1 is acquired, and an angle of the object to be inspected in the relative rotation direction of the area sensor with respect to the object to be inspected at the time when the X-ray image C1 is acquired, accuracy of the composite X-ray image to be generated is lowered.

That is, if the angle of the object to be inspected in the relative rotation direction of the X-ray detector with respect to the object to be inspected varies at the time when each of three X-ray images A1 to C1 to be composited is acquired, accuracy of the composite X-ray image to be generated is lowered. When accuracy of the composite X-ray image is lowered, accuracy of the CT image to be generated based on the composite X-ray image is also lowered.

Herein, for example, by controlling a timing for acquiring the X-ray image by the area sensor based on a detection result of an encoder for detecting a rotational position of the table on which the object to be inspected is mounted, it is possible to suppress variations in the angle of the object to be inspected in the relative rotation direction of the X-ray detector with respect to the object to be inspected at the time when each of the three X-ray images A1 to C1 to be composited is acquired. However, in a case of acquiring a large number of X-ray images while rotating the object to be inspected once (for example, in a case of acquiring 1000 X-ray images per) 0.36°), it is difficult to rotate the object to be inspected at high speed if the timing for acquiring the X-ray image by the area sensor is controlled based on the detection result of the encoder, and as a result, a time for acquiring the X-ray image is prolonged.

Thus, the present invention provides an X-ray inspection apparatus that continuously acquires X-ray images by fixed periods while rotating an X-ray generator and an X-ray detector at a fixed speed relatively to an object to be inspected, and composites a plurality of the X-ray images that are acquired at a predetermined angle in a relative rotation direction of the X-ray detector with respect to the object to be inspected, the X-ray inspection apparatus with which a time for acquiring the X-ray image can be shortened although it is possible to suppress variations in the angle of the object to be inspected in the relative rotation direction of the X-ray detector with respect to the object to be inspected at the time when each of the X-ray images to be composited and used for generating a CT image is acquired.

SUMMARY

To solve the problem described above, the present inventor carried out various examinations. As a result, the present inventor found that it is possible to start a motor always at substantially the same timing as an output timing of an acquisition timing signal by disposing a controller that outputs a motor driving signal input to a motor driver, a start signal generation circuit that generates a controller start signal for causing the controller to start to output the motor driving signal, and a generation circuit control unit that controls the start signal generation circuit on a control unit to which an X-ray detector and a motor for causing the X-ray detector to rotate relatively to an object to be inspected are electrically connected, by causing the X-ray detector to start to acquire an X-ray image before the X-ray image used for generating a CT image starts to be acquired and before the motor is started, and to output a periodic acquisition timing signal indicating the timing for acquiring the X-ray image, by causing the generation circuit control unit to generate a motor start signal for starting the motor based on the acquisition timing signal, and furthermore, by causing the start signal generation circuit to generate a controller start signal based on the acquisition timing signal and the motor start signal, and to start the motor by directly inputting the controller start signal to the controller from the start signal generation circuit.

Additionally, for example, in a case of compositing a first X-ray image of the object to be inspected that is obtained when the object to be inspected is rotated once and a second X-ray image of the object to be inspected that is obtained thereafter when the object to be inspected is temporarily stopped and rotated once again to generate the CT image, the present inventor found that, in addition to the above description, by using X-ray images that are acquired after a rotation speed of the motor reaches a fixed speed and a rotation speed of the object to be inspected reaches a fixed speed as the first X-ray image and the second X-ray image to generate the CT image, variations are hardly caused in the angle of the object to be inspected in the relative rotation direction of the X-ray detector with respect to the object to be inspected at the time when the first X-ray image is acquired and the angle of the object to be inspected in the relative rotation direction of the X-ray detector with respect to the object to be inspected at the time when the second X-ray image is acquired even if the motor is rotated at a relatively high speed (that is, the object to be inspected is rotated at a relatively high speed).

That is, as a result of various examinations, the present inventor found that, by performing the processing described above, it is possible to shorten the time for acquiring the X-ray image although it is possible to suppress variations in the angle of the object to be inspected in the relative rotation direction of the X-ray detector with respect to the object to be inspected at the time when each of a plurality of X-ray images to be composited and used for generating the CT image is acquired.

The X-ray inspection apparatus according to the present invention is based on such novel findings, and includes: an X-ray generator; an X-ray detector that is placed to be opposite to the X-ray generator across an object to be inspected, and acquires an X-ray image of the object to be inspected; a rotation mechanism that rotates the X-ray generator and the X-ray detector or rotates the object to be inspected so that the X-ray generator and the X-ray detector are rotated relatively to the object to be inspected on an outer peripheral side of the object to be inspected; and a control unit to which the X-ray generator and the X-ray detector are electrically connected. The X-ray inspection apparatus continuously acquires X-ray images by fixed periods to generate a CT image while rotating the X-ray generator and the X-ray detector at a fixed speed relatively to the object to be inspected. The rotation mechanism includes a motor as a driving source electrically connected to the control unit. The X-ray detector starts to acquire the X-ray image before the X-ray image used for generating the CT image starts to be acquired and before the motor is started, and outputs a periodic acquisition timing signal indicating a timing for acquiring the X-ray image. The control unit includes: a motor driver that supplies electric power to the motor; a controller that outputs a motor driving signal to be input to the motor driver; a start signal generation circuit that generates a controller start signal for causing the controller to start to output the motor driving signal; and a generation circuit control unit that controls the start signal generation circuit. A first signal that is generated based on the acquisition timing signal and serves as an on/off signal of a fixed period the signal level of which varies depending on an output timing of the acquisition timing signal is input to the generation circuit control unit after the acquisition timing signal starts to be output, or the acquisition timing signal is input thereto. The generation circuit control unit generates a motor start signal for starting the motor based on the first signal and outputs the motor start signal to the start signal generation circuit in a case in which the first signal is input to the generation circuit control unit, and generates the motor start signal based on the acquisition timing signal and outputs the motor start signal to the start signal generation circuit in a case in which the acquisition timing signal is input to the generation circuit control unit. At least one of the first signal and the acquisition timing signal is input to the start signal generation circuit. The start signal generation circuit generates the controller start signal and outputs the controller start signal to the controller at an output timing of the acquisition timing signal after receiving the motor start signal. The CT image is generated based on a plurality of the X-ray images that are acquired after a rotation speed of the motor reaches a fixed speed.

In the X-ray inspection apparatus according to the present invention, the X-ray detector starts to acquire the X-ray image before the X-ray image used for generating the CT image starts to be acquired and before the motor is started, and outputs the periodic acquisition timing signal indicating the timing for acquiring the X-ray image. In the present invention, the control unit includes the controller that outputs the motor driving signal to be input to the motor driver, the start signal generation circuit that generates the controller start signal for causing the controller to start to output the motor driving signal, and the generation circuit control unit that controls the start signal generation circuit.

Furthermore, in the present invention, in a case in which the first signal that is generated based on the acquisition timing signal and serves as an on/off signal of a fixed period the signal level of which varies depending on the output timing of the acquisition timing signal is input to the generation circuit control unit after the acquisition timing signal starts to be output, the generation circuit control unit generates the motor start signal for starting the motor based on the first signal, and outputs the motor start signal to the start signal generation circuit. In a case in which the acquisition timing signal is input to the generation circuit control unit, the generation circuit control unit generates the motor start signal based on the acquisition timing signal, and outputs the motor start signal to the start signal generation circuit.

That is, in the present invention, the generation circuit control unit generates the motor start signal indirectly based on the acquisition timing signal and outputs the motor start signal to the start signal generation circuit in a case in which the first signal is input to the generation circuit control unit, and generates the motor start signal directly based on the acquisition timing signal and outputs the motor start signal to the start signal generation circuit in a case in which the acquisition timing signal is input to the generation circuit control unit.

Furthermore, in the present invention, the start signal generation circuit generates the controller start signal and outputs the controller start signal to the controller at the output timing of the acquisition timing signal after receiving the motor start signal. That is, in the present invention, the start signal generation circuit generates the controller start signal based on the acquisition timing signal and the motor start signal, and directly inputs the controller start signal to the controller. In the present invention, the motor is started by directly inputting the controller start signal to the controller from the start signal generation circuit. Thus, in the present invention, the motor can be always started at substantially the same timing as the output timing of the acquisition timing signal.

In the present invention, the CT image is generated based on the X-ray images that are acquired after the rotation speed of the motor reaches a fixed speed. That is, in the present invention, the CT image is generated based on the X-ray images that are acquired after a relative rotation speed of the X-ray detector with respect to the object to be inspected reaches a fixed speed.

Thus, according to the present invention, even if the motor is rotated at a relatively high speed (that is, even if the X-ray detector is rotated at a relatively high speed relatively to the object to be inspected), it is possible to suppress variations in the angle of the object to be inspected in the relative rotation direction of the X-ray detector with respect to the object to be inspected at the time when each of the X-ray images to be composited and used for generating the CT image is acquired. That is, according to the present invention, it is possible to shorten the time for acquiring the X-ray image although it is possible to suppress variations in the angle of the object to be inspected in the relative rotation direction of the X-ray detector with respect to the object to be inspected at the time when each of the X-ray images to be composited and used for generating the CT image is acquired.

In the present invention, for example, the acquisition timing signal is input to the start signal generation circuit, the start signal generation circuit generates the first signal and outputs the first signal to the generation circuit control unit, and the first signal is input to the generation circuit control unit.

In the present invention, for example, the generation circuit control unit previously stores a number of reference pulses equal to or larger than a number of pulses of the first signal after the first signal starts to be input to the generation circuit control unit until a period of the first signal is stabilized. The generation circuit control unit counts the number of pulses of the first signal after the first signal starts to be input to the generation circuit control unit, and when the number of pulses of the first signal reaches the number of reference pulses, the generation circuit control unit generates the motor start signal and outputs the motor start signal to the start signal generation circuit.

In the present invention, it is preferable that the generation circuit control unit generates a controller waiting signal and outputs the controller waiting signal to the controller before generating the motor start signal, the controller waiting signal for causing the controller to be in an input waiting state for the controller start signal. With this configuration, it is possible to prevent a situation in which the controller malfunctions due to influence of noise input to the controller, and erroneously starts to output the motor driving signal. Thus, it is possible to reliably cause the controller to start to output the motor driving signal at the timing when the controller start signal is input.

In the present invention, a motor is a stepping motor or a servomotor, for example. According to the examinations by the present inventor, the motor is rotated at a fixed speed corresponding to a clock signal generated in the controller in a case in which the motor is a stepping motor and is open-loop controlled, thus, as compared with a case in which the motor is a servomotor and is feedback controlled, it is possible to effectively suppress variations in the angle of the object to be inspected in the relative rotation direction of the X-ray detector with respect to the object to be inspected at the time when each of the X-ray images to be composited and used for generating the CT image is acquired.

Advantageous Effects of Invention

As described above, according to the present invention, with the X-ray inspection apparatus that continuously acquires the X-ray images by fixed periods while rotating the X-ray generator and the X-ray detector at a fixed speed relatively to the object to be inspected, and composites the X-ray images that are acquired at a predetermined angle in the relative rotation direction of the X-ray detector with respect to the object to be inspected, it is possible to shorten the time for acquiring the X-ray image although it is possible to suppress variations in the angle of the object to be inspected in the relative rotation direction of the X-ray detector with respect to the object to be inspected at the time when each of the X-ray images to be composited and used for generating the CT image is acquired.

DETAILED DESCRIPTION

Embodiments of the present invention will be described below with reference to the drawings.

(Configuration of X-Ray Inspection Apparatus)

Figure 1:
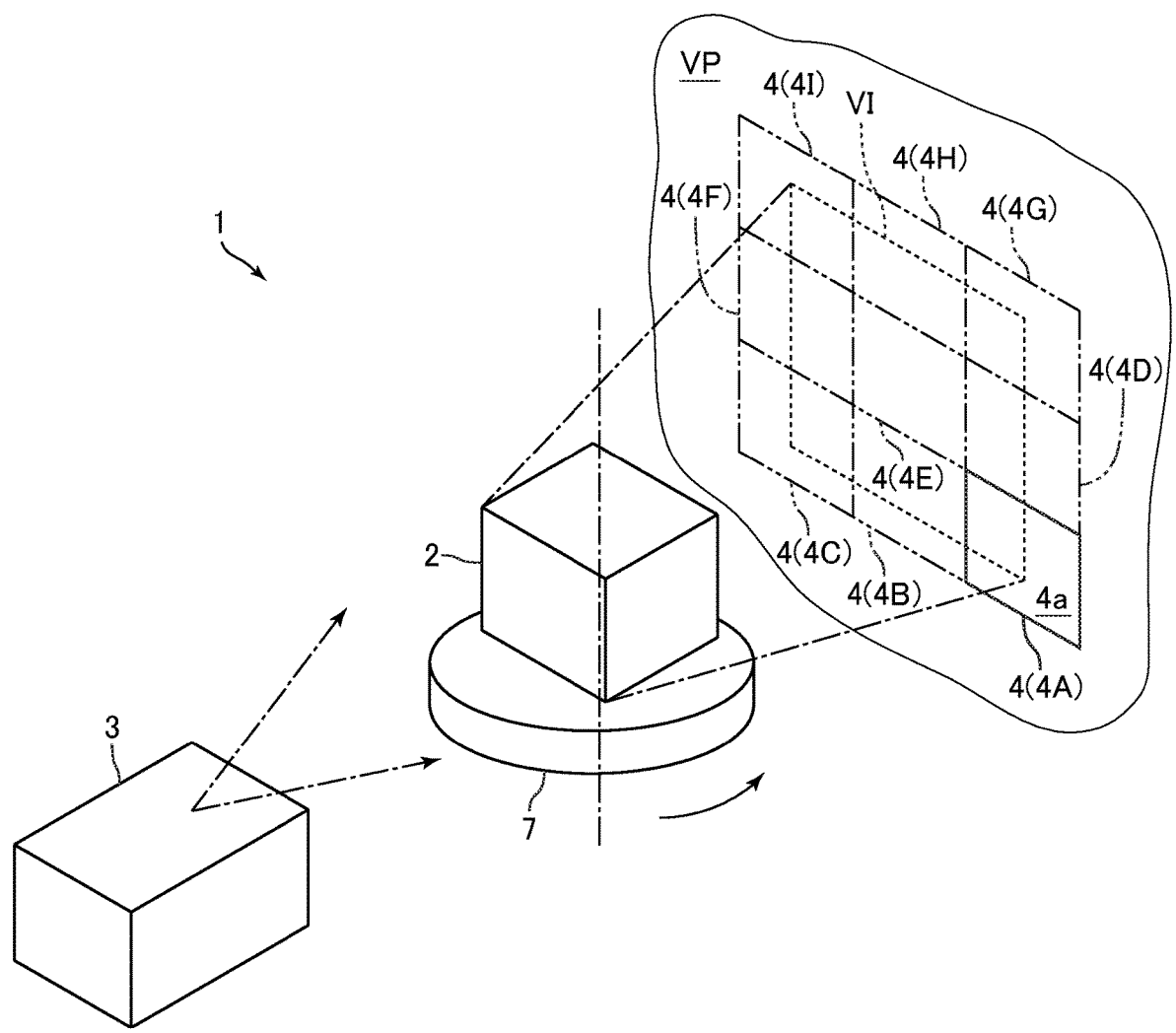
FIG. 1 is a schematic diagram of a mechanical configuration of an X-ray inspection apparatus according to an embodiment of the present invention.
Figure 2:
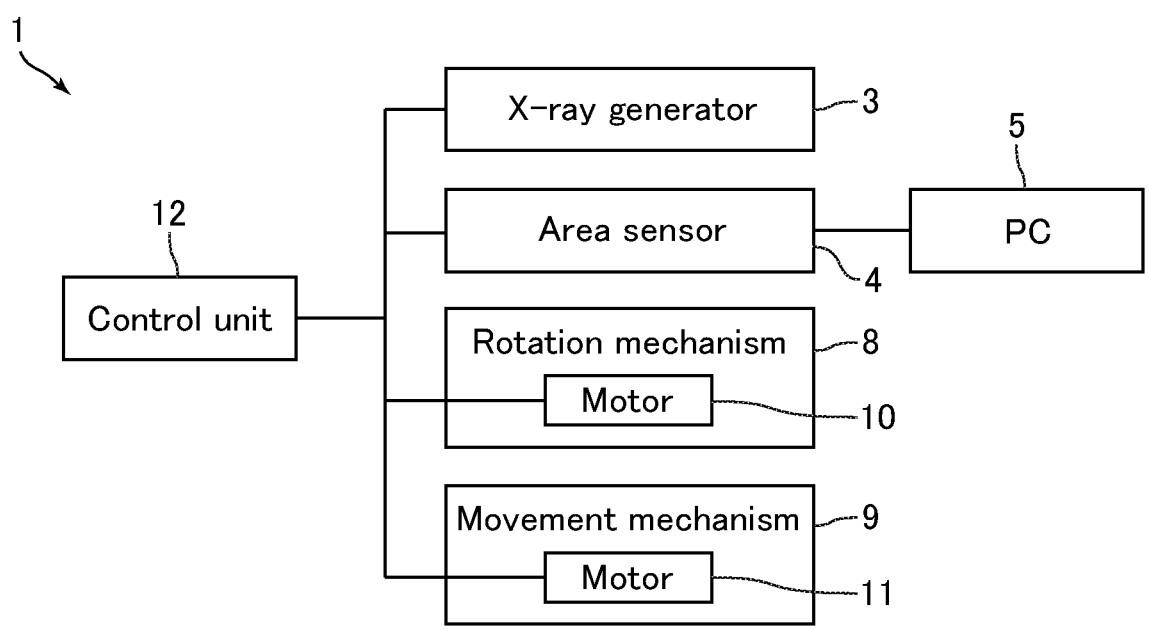
FIG. 2 is a block diagram for explaining a schematic configuration of the X-ray inspection apparatus illustrated in FIG. 1.

FIG. 1 is a schematic diagram of a mechanical configuration of an X-ray inspection apparatus 1 according to an embodiment of the present invention. FIG. 2 is a block diagram for explaining a schematic configuration of the X-ray inspection apparatus 1 illustrated in FIG. 1.

The X-ray inspection apparatus 1 according to the present embodiment is an apparatus for nondestructively inspecting an inner part of an object 2 to be inspected such as an industrial product. Specifically, the X-ray inspection apparatus 1 is an apparatus for inspecting the object 2 to be inspected such as an engine block that is relatively large. The X-ray inspection apparatus 1 includes an X-ray generator 3 that emits X-rays to the object 2 to be inspected, and an X-ray detector 4 that is placed to be opposed to the X-ray generator 3 across the object 2 to be inspected to acquire an X-ray image of the object 2 to be inspected. The X-ray detector 4 according to the present embodiment is an area sensor (two-dimensional X-ray detector). Thus, hereinafter, the X-ray detector 4 is referred to as an "area sensor 4".

The X-ray inspection apparatus 1 also includes a personal computer (PC) 5 that captures and processes the X-ray image acquired by the area sensor 4, a table 7 on which the object 2 to be inspected is mounted, a rotation mechanism 8 that rotates the table 7, and a movement mechanism 9 that translates the area sensor 4. The rotation mechanism 8 includes a motor 10 as a driving source for rotating the table 7. The movement mechanism 9 includes a motor 11 as a driving source for translating the area sensor 4. The X-ray generator 3, the area sensor 4, and the motors 10 and 11 are electrically connected to a control unit 12.

The X-ray generator 3 emits cone-shaped X-rays toward the object 2 to be inspected, for example. An optical axis of the X-ray generator 3 is parallel to a horizontal direction. The area sensor 4 is a two-dimensional camera. A detection face 4a of the area sensor 4 is formed in a square shape. Assuming that a direction parallel to the optical axis of the X-ray generator 3 is a front and rear direction, the detection face 4a is placed to be orthogonal to the front and rear direction. Assuming that a direction orthogonal to an upper and lower direction and the front and rear direction is a right and left direction, the area sensor 4 is placed so that two of the four sides of the detection face 4a formed in a square shape are parallel to the upper and lower direction, and the other two sides are parallel to the right and left direction.

The table 7 is placed between the X-ray generator 3 and the area sensor 4 in the front and rear direction so that the object 2 to be inspected is placed between the X-ray generator 3 and the area sensor 4. The rotation mechanism 8 rotates the table 7 using the upper and lower direction as an axial direction of the rotation. That is, the rotation mechanism 8 rotates the object 2 to be inspected mounted on the table 7 so that the X-ray generator 3 and the area sensor 4 rotate relatively to the object 2 to be inspected on an outer peripheral side of the object 2 to be inspected. The movement mechanism 9 translates the area sensor 4 in the right and left direction and the upper and lower direction. Hereinafter, a direction of relative rotation of the X-ray generator 3 and the area sensor 4 with respect to the object 2 to be inspected is referred to as a "relative rotation direction" in some cases.

Assuming that a plane including the detection face 4a of the area sensor 4 is a virtual projection plane VP, and a projection image of the entire object 2 to be inspected that is projected on the virtual projection plane VP by X-rays emitted from the X-ray generator 3 is a virtual projection image VI, the detection face 4a is smaller than the virtual projection image VI in the upper and lower direction and the right and left direction. In the present embodiment, an X-ray image of the entire object 2 to be inspected can be acquired by the area sensor 4 by moving the area sensor 4 to nine positions.

Specifically, the X-ray image of the entire object 2 to be inspected can be acquired by the area sensor 4 by moving the area sensor 4 to nine positions including a first placement position 4A at which a right end side of a lower end side portion of the object 2 to be inspected is projected, a second placement position 4B at which a center part in the right and left direction of the lower end side portion of the object 2 to be inspected is projected, a third placement position 4C at which a left end side of the lower end side portion of the object 2 to be inspected is projected, a fourth placement position 4D at which a right end side of a center portion in the upper and lower direction of the object 2 to be inspected is projected, a fifth placement position 4E at which a center portion of the object 2 to be inspected is projected, a sixth placement position 4F at which a left end side of the center portion in the upper and lower direction of the object 2 to be inspected is projected, a seventh placement position 4G at which a right end side of an upper end side portion of the object 2 to be inspected is projected, an eighth placement position 4H at which a center part in the right and left direction of the upper end side portion of the object 2 to be inspected is projected, and a ninth placement position 4I at which a left end side of the upper end side portion of the object 2 to be inspected is projected.

(Method for Acquiring X-Ray Image and Method for Processing X-Ray Image)

Figure 3A:
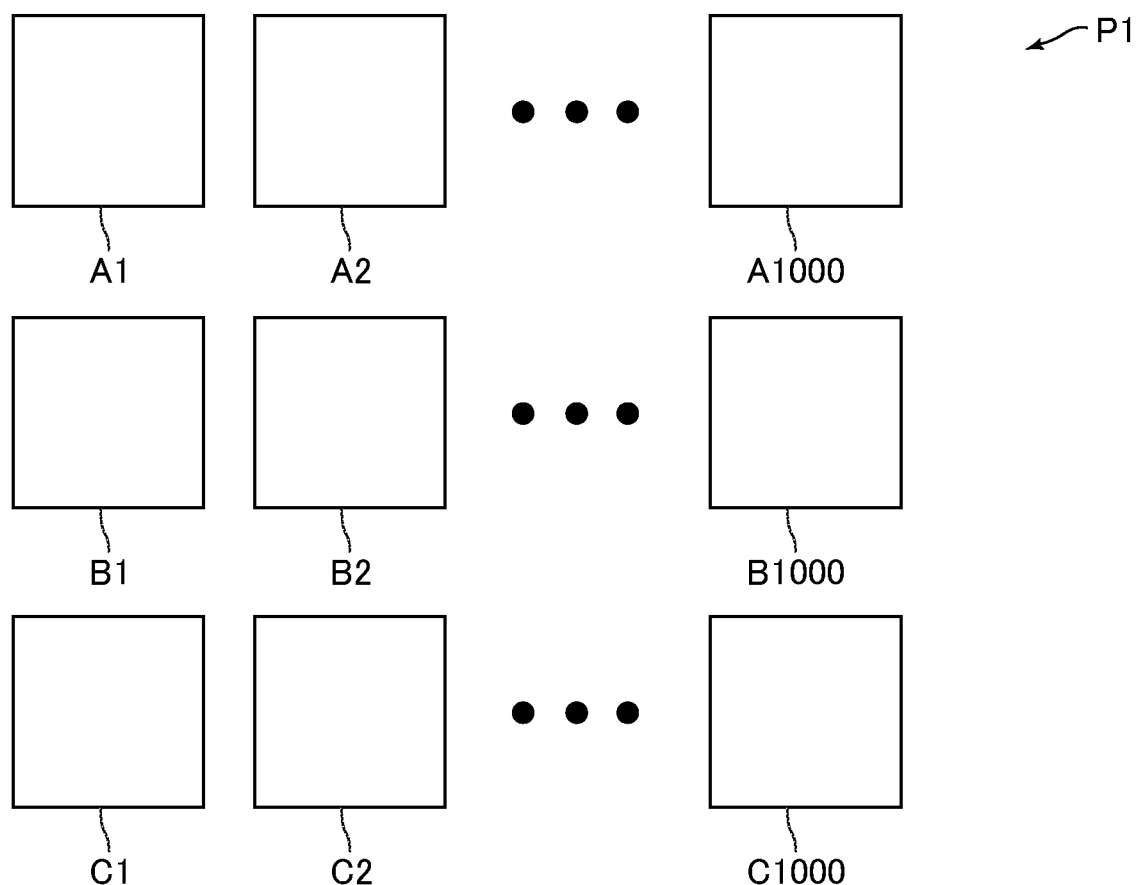
FIGS. 3A and 3B is a diagram for explaining composite processing by a PC illustrated in FIG. 2.
Figure 3B:
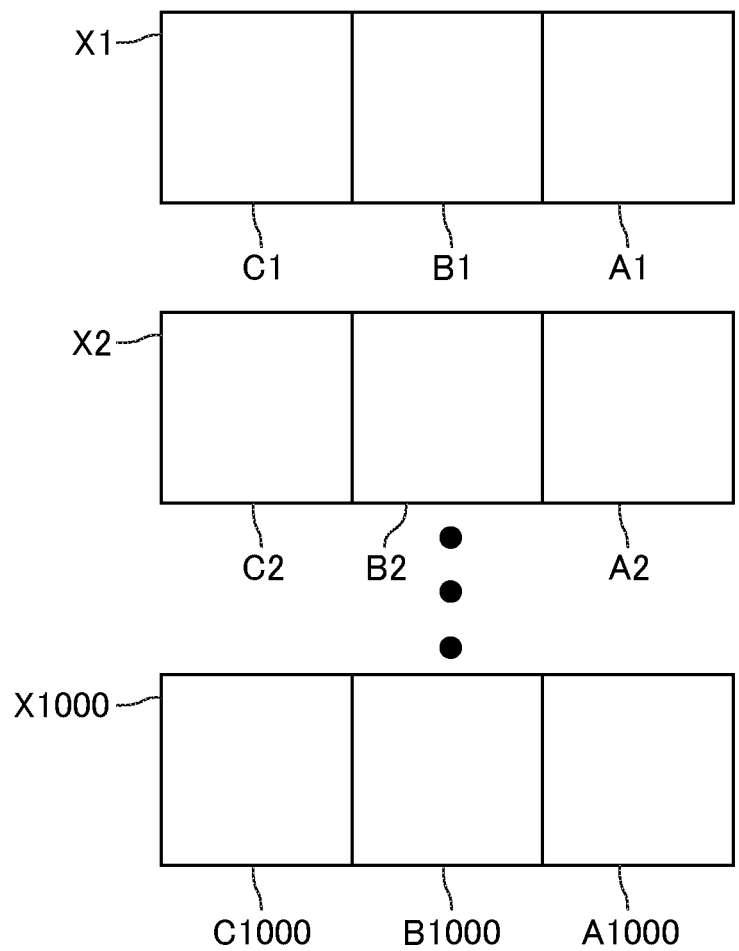

FIGS. 3A and 3B is a diagram for explaining composite processing by the PC 5 illustrated in FIG. 2.

When the object 2 to be inspected is inspected by the X-ray inspection apparatus 1, first, the area sensor 4 is moved to and stopped at the first placement position 4A. In this state, the object 2 to be inspected mounted on the table 7 is rotated once at a fixed speed, and X-ray images A1 to A1000 (refer to FIG. 3A) are continuously acquired per fixed angle by the area sensor 4. That is, the X-ray images A1 to A1000 are continuously acquired by fixed periods while rotating the X-ray generator 3 and the area sensor 4 at a fixed speed relatively to the object 2 to be inspected. In the present embodiment, 1000 X-ray images A1 to A1000 are successively acquired per 0.36°. However, the number of X-ray images to be acquired may be smaller than 1000, or may be larger than 1000.

Thereafter, the area sensor 4 is moved from the first placement position 4A to the second placement position 4B to be stopped. In this state, the object 2 to be inspected is rotated once at a fixed speed, and 1000 X-ray images B1 to B1000 (refer to FIG. 3A) are continuously acquired per 0.36° by the area sensor 4. Thereafter, the area sensor 4 is moved from the second placement position 4B to the third placement position 4C to be stopped. In this state, the object 2 to be inspected is rotated once at a fixed speed, and 1000

X-ray images C1 to C1000 (refer to FIG. 3A) are continuously acquired per 0.36° by the area sensor 4.

The X-ray images A1, B1, and C1 are X-ray images that are acquired at the same angle in the relative rotation direction of the area sensor 4 with respect to the object 2 to be inspected. When the X-ray images A1, B1, and C1 are placed in this order from the right side to be connected and composited, obtained is an X-ray image of an origin position in the relative rotation direction of the lower end side portion of the object 2 to be inspected. Similarly, X-ray images A2, B2, and C2 are X-ray images that are acquired at the same angle in the relative rotation direction. When the X-ray images A2, B2, and C2 are placed in this order from the right side to be connected and composited, obtained is an X-ray image of a position shifted by 0.36° from the origin position in the relative rotation direction of the lower end side portion of the object 2 to be inspected.

That is, assuming that "n" is an integer number from 1 to 1000, X-ray images An, Bn, and Cn are X-ray images that are acquired at the same angle in the relative rotation direction, and when the X-ray images An, Bn, and Cn are placed in this order from the right side to be connected and composited, obtained is an X-ray image of a position shifted by $(0.36\times(n-1))°$ from the origin position in the relative rotation direction of the lower end side portion of the object 2 to be inspected. Each of the X-ray images An, Bn, and Cn is an X-ray image of a position shifted by $(0.36\times(n-1))°$ from the origin position in the relative rotation direction of the lower end side portion of the object 2 to be inspected, and is also an X-ray image of the lower end side portion of the object 2 to be inspected that is divided in the right and left direction.

Assuming that a column of X-ray images P1 is a plurality of the X-ray images of the lower end side portion of the object 2 to be inspected that are divided in the right and left direction and acquired over 360° per fixed angle in the relative rotation direction, when the area sensor 4 acquires the column of X-ray images P1, the area sensor 4 is moved to and stopped at the fourth placement position 4D. Thereafter, by performing the same operation as the operation described above, X-ray images D1 to D1000 are acquired by the area sensor 4 placed at the fourth placement position 4D, X-ray images E1 to E1000 are acquired by the area sensor 4 placed at the fifth placement position 4E, and X-ray images F1 to F1000 are acquired by the area sensor 4 placed at the sixth placement position 4F.

Assuming that a column of X-ray images P2 is a plurality of the X-ray images of the center portion of the object 2 to be inspected in the upper and lower direction that are divided in the right and left direction and acquired over 360° per fixed angle in the relative rotation direction, when the area sensor 4 acquires the column of X-ray images P2, the area sensor 4 is moved to the seventh placement position 4G. Thereafter, by performing the same operation, X-ray images G1 to G1000 are acquired by the area sensor 4 placed at the seventh placement position 4G, X-ray images H1 to H1000 are acquired by the area sensor 4 placed at the eighth placement position 4H, and X-ray images I1 to I1000 are acquired by the area sensor 4 placed at the ninth placement position 4I.

When the area sensor 4 acquires the X-ray images I1 to I1000, acquisition of the X-ray images of the object 2 to be inspected by the area sensor 4 ends. That is, assuming that a column of X-ray images P3 is a plurality of the X-ray images of the upper end side portion of the object 2 to be inspected that are divided in the right and left direction and acquired over 360° per fixed angle in the relative rotation direction, when the area sensor 4 acquires the column of X-ray images P3, acquisition of the X-ray images of the object 2 to be inspected by the area sensor 4 ends.

The PC 5 successively captures the X-ray images acquired by the area sensor 4. After capturing the column of X-ray images P1 (that is, after capturing the X-ray images A1 to A1000, B1 to B1000, and C1 to C1000), first, the PC 5 performs composite processing of connecting and compositing the X-ray images in the right and left direction per fixed angle in the relative rotation direction, the X-ray images that are acquired at the same angle in the relative rotation direction of the area sensor 4 with respect to the object 2 to be inspected in the column of X-ray images P1.

Specifically, as illustrated in FIG. 3B, the PC 5 places the three X-ray images A1, B1, and C1 in this order from the right side to be connected and composited, and generates a composite X-ray image X1. Similarly, the PC 5 places the three X-ray images A2, B2, and C2 in this order from the right side to be connected and composited, and generates a composite X-ray image X2. The PC 5 performs the same composite processing until a composite X-ray image X1000 is generated by connecting three X-ray images A1000, B1000, and C1000. That is, the PC 5 places the three X-ray images An, Bn, and Cn in this order from the right side to be connected and composited, and generates 1000 composite X-ray images Xn.

Thereafter, the PC 5 performs CT image generation processing of generating a CT image by performing a predetermined arithmetic operation based on the composite X-ray images X1 to X1000 over 360°. The PC 5 also captures the column of X-ray images P2, and similarly performs the composite processing and the CT image generation processing on the column of X-ray images P2. The PC 5 also captures the column of X-ray images P3, and similarly performs the composite processing and the CT image generation processing on the column of X-ray images P3. That is, in the present embodiment, the CT image is generated for each of the columns of X-ray images P1 to P3.

(Method for Starting Motor)

Figure 4:
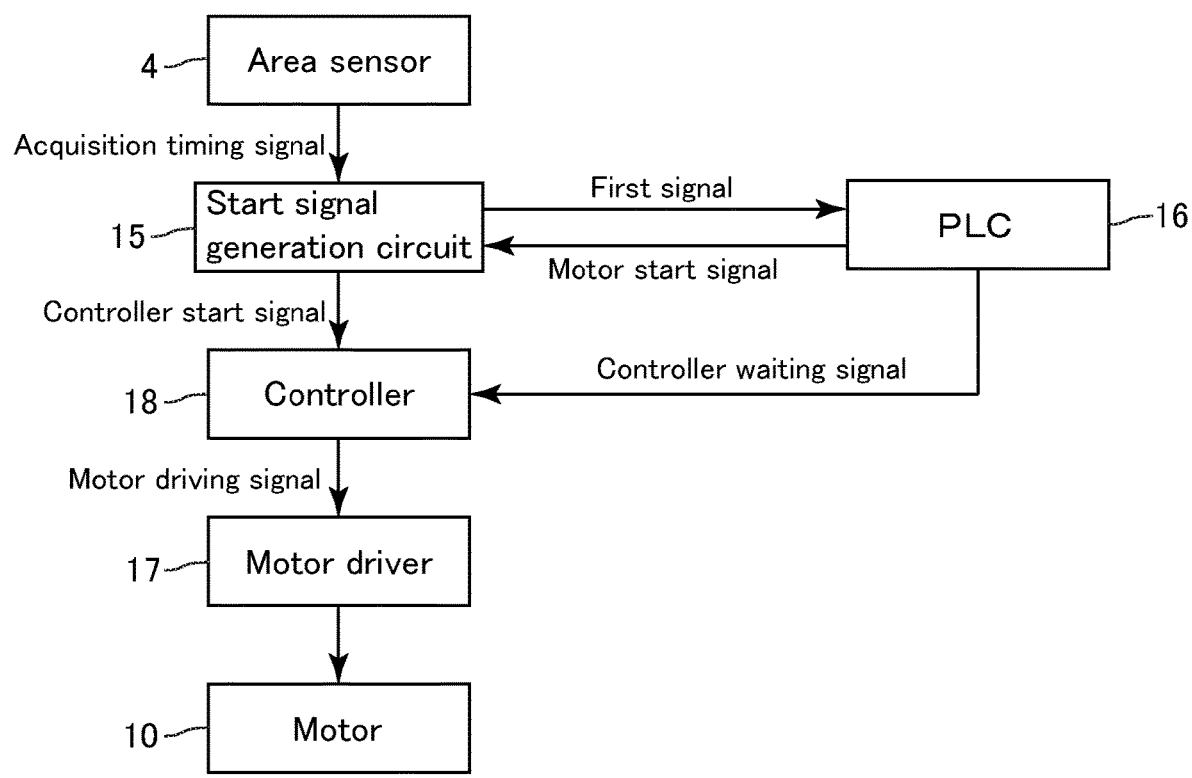
FIG. 4 is a block diagram for explaining a configuration of a control unit illustrated in FIG. 2 and a method for starting a motor.
Figure 5:
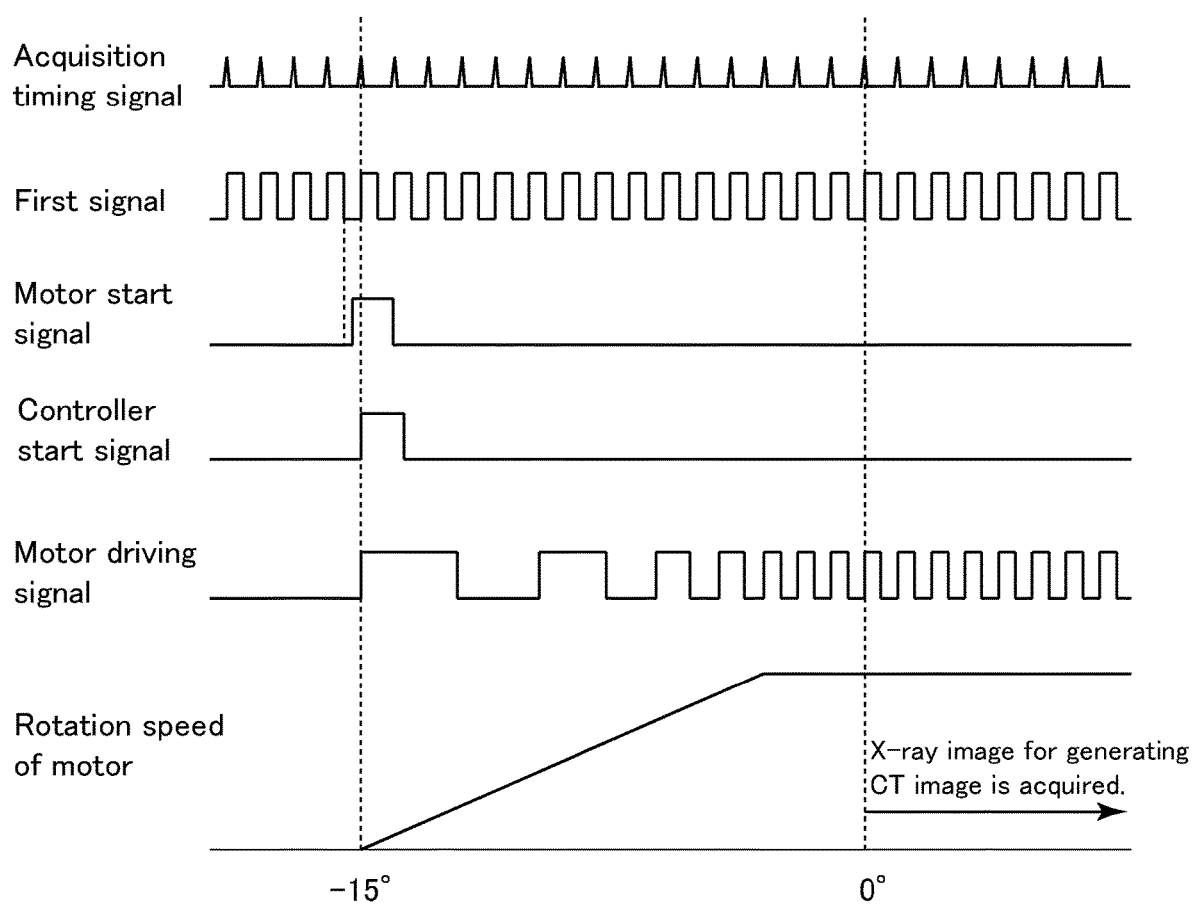
FIG. 5 is an example of a timing chart at the time of starting the motor illustrated in FIG. 2.

FIG. 4 is a block diagram for explaining a configuration of the control unit 12 illustrated in FIG. 2 and a method for starting the motor 10. FIG. 5 is an example of a timing chart at the time of starting the motor 10 illustrated in FIG. 2.

As described above, the rotation mechanism 8 includes the motor 10. The motor 10 according to the present embodiment is a stepping motor (pulse motor). As a configuration related to control of the motor 10, the control unit 12 includes a motor driver 17 that supplies electric power to the motor 10, a controller 18 that outputs a motor driving signal to be input to the motor driver 17, a start signal generation circuit 15 that generates a controller start signal for causing the controller 18 to start to output the motor driving signal, and a programmable logic controller (PLC, sequencer) 16 serving as a generation circuit control unit that controls the start signal generation circuit 15.

The controller 18 may be disposed outside the motor driver 17 as illustrated in FIG. 4, or may be incorporated in the motor driver 17. That is, the controller 18 may be separated from the motor driver 17, or the controller 18 may be integrated with the motor driver 17. The start signal generation circuit 15 may be disposed outside the controller 18 as illustrated in FIG. 4, or may be incorporated in the controller 18. That is, the start signal generation circuit 15 may be separated from the controller 18, or the start signal generation circuit 15 may be integrated with the controller 18. Alternatively, the controller 18 and the start signal generation circuit 15 may be incorporated in the motor driver 17. That is, the start signal generation circuit 15, the controller 18, and the motor driver 17 may be integrated with each other.

In the present embodiment, as described above, the three X-ray images An, Bn, and Cn are composited through the composite processing. In the present embodiment, in a state in which the area sensor 4 is placed at each of the first placement position 4A to the third placement position 4C, as described below, the motor 10 is started to start rotation of the object 2 to be inspected so as to suppress variations in an angle of the object 2 to be inspected in the relative rotation direction of the area sensor 4 with respect to the object 2 to be inspected at the time when the X-ray image An is acquired, an angle of the object 2 to be inspected in the relative rotation direction of the area sensor 4 with respect to the object 2 to be inspected at the time when the X-ray image Bn is acquired, and an angle of the object 2 to be inspected in the relative rotation direction of the area sensor 4 with respect to the object 2 to be inspected at the time when the X-ray image Cn is acquired. Also in a state in which the area sensor 4 is placed at each of the fourth placement position 4D to the ninth placement position 4I, similarly, the motor 10 is started to start rotation of the object 2 to be inspected.

First, the area sensor 4 starts to acquire the X-ray image before starting to acquire the X-ray image used for generating the CT image. Specifically, the area sensor 4 starts to acquire the X-ray image before the motor 10 is started. Thus, the same X-ray images are acquired by the area sensor 4 until the motor 10 is started (until the motor 10 starts to rotate). The area sensor 4 also outputs a periodic acquisition timing signal indicating a timing for acquiring the X-ray image to the start signal generation circuit 15.

As described above, the X-ray images are continuously acquired by fixed periods, so that the acquisition timing signal is a signal of a fixed period that is generated based on a clock signal generated by a quartz oscillator and the like incorporated in the area sensor 4 (refer to FIG. 5). The area sensor 4 acquires the X-ray image in accordance with the acquisition timing signal. Specifically, the area sensor 4 acquires the X-ray image at an output timing of the acquisition timing signal. A period of the acquisition timing signal is stabilized when a predetermined time has elapsed after the acquisition timing signal starts to be output. That is, a frequency of the acquisition timing signal is stabilized when a predetermined time has elapsed after the acquisition timing signal starts to be output.

The acquisition timing signal is input to the start signal generation circuit 15. A signal voltage of the acquisition timing signal is lower than a signal voltage suitable for processing by the PLC 16. An output time (rise time) of the acquisition timing signal is shorter than an output time of a signal suitable for processing by the PLC 16. The start signal generation circuit 15 amplifies the acquisition timing signal and extends the output time of the acquisition timing signal as hardware so that the acquisition timing signal becomes a signal suitable for processing by the PLC 16, and generates a first signal. That is, the start signal generation circuit 15 generates the first signal based on the acquisition timing signal. As illustrated in FIG. 5, the first signal is an on/off signal of a fixed period the signal level of which varies depending on the output timing of the acquisition timing signal. The first signal is an on/off signal having a rectangular wave shape.

The first signal according to the present embodiment is an on/off signal that is turned on at the output timing of the acquisition timing signal and turned off thereafter before the next output timing of the acquisition timing signal, and the period of the first signal is equal to a period of the acquisition timing. That is, a frequency of the first signal is equal to a frequency of the acquisition timing. The signal voltage of the first signal is seven times the signal voltage of the acquisition timing signal, for example, and an on time of the first signal is 250 times the output time of the acquisition timing signal, for example.

The start signal generation circuit 15 outputs the first signal to the PLC 16. As described above, the period of the acquisition timing signal is stabilized when a predetermined time has elapsed after the acquisition timing signal starts to be output, so that the period of the first signal is also stabilized when a predetermined time has elapsed after the first signal starts to be output (that is, after the acquisition timing signal starts to be output). That is, the frequency of the first signal is stabilized when a predetermined time has elapsed after the first signal starts to be output.

The first signal is input to the PLC 16. Specifically, when the area sensor 4 starts to output the acquisition timing signal, and the start signal generation circuit 15 generates the first signal, the first signal is immediately input to the PLC 16. That is, the first signal is input to the PLC 16 after the acquisition timing signal starts to be output. More specifically, the first signal is input to the PLC 16 immediately after the acquisition timing signal starts to be output. When the first signal starts to be input to the PLC 16, the PLC 16 recognizes that the area sensor 4 has started to acquire the X-ray image.

The PLC 16 previously stores a number of reference pulses equal to or larger than a number of pulses of the first signal after the first signal starts to be input to the PLC 16 (that is, after the first signal starts to be output from the start signal generation circuit 15, after the acquisition timing signal starts to be input to the start signal generation circuit 15) until the period of the first signal is stabilized. For example, the number of pulses of the first signal after the first signal starts to be input to the PLC 16 until the period of the first signal is stabilized is "50", and the PLC 16 previously stores "100" as the number of reference pulses.

The PLC 16 counts the number of pulses of the first signal after the first signal starts to be input to the PLC 16, and when the counted number of pulses of the first signal reaches the number of reference pulses, the PLC 16 generates a motor start signal for starting the motor 10 and outputs the motor start signal to the start signal generation circuit 15. That is, the PLC 16 generates the motor start signal based on the first signal, and outputs the motor start signal to the start signal generation circuit 15. As illustrated in FIG. 5, the motor start signal is a one-shot signal (one-pulse signal).

Before generating the motor start signal, the PLC 16 generates a controller waiting signal for causing the controller 18 to be in an input waiting state for the controller start signal (that is, a controller waiting signal for causing the controller 18 to be in an output start waiting state for the motor driving signal), and outputs the controller waiting signal to the controller 18. Specifically, when the first signal is input to the PLC 16, the PLC 16 generates and outputs the controller waiting signal to the controller 18. The controller waiting signal is a one-shot signal.

The start signal generation circuit 15 is electrically connected to the controller 18. When the motor start signal is input to the start signal generation circuit 15, the start signal generation circuit 15 generates and outputs the controller start signal to the controller 18. Specifically, as illustrated in FIG. 5, the start signal generation circuit 15 generates and outputs the controller start signal to the controller 18 at the first output timing (generation timing) of the acquisition timing signal after receiving the motor start signal.

More specifically, the start signal generation circuit 15 immediately generates and outputs the controller start signal to the controller 18 at the first output timing of the acquisition timing signal after a rising edge of the motor start signal is detected (after a flag of the motor start signal is set). That is, the start signal generation circuit 15 generates and outputs the controller start signal to the controller 18 at a moment when a rising edge of the first signal is firstly detected after the rising edge of the motor start signal is detected. The controller start signal is a one-shot signal.

When the controller start signal is input to the controller 18, the controller 18 immediately starts to output the motor driving signal to the motor driver 17. That is, the controller 18 starts to output the motor driving signal to the motor driver 17 at a moment when the controller start signal is input. The motor driving signal is an on/off signal (pulse signal) having a rectangular wave shape. The motor driving signal is generated based on a clock signal generated by a quartz oscillator and the like incorporated in the controller 18. A condition for the controller 18 to output the motor driving signal is that the controller waiting signal has been input to the controller 18.

The motor driver 17 to which the motor driving signal has been input immediately supplies electric power to the motor 10. The motor driver 17 to which the motor driving signal has been input operates in accordance with the motor driving signal, and supplies electric power to the motor 10. A period of the motor driving signal is gradually shortened in an acceleration region of the motor 10, and is fixed when a rotation speed of the motor 10 reaches a fixed speed.

Assuming that the origin position of the object 2 to be inspected in the relative rotation direction of the area sensor 4 with respect to the object 2 to be inspected is a position at 0°, the motor 10 is stopped at a position where the object 2 to be inspected is rotated by 15° in a direction opposite to the relative rotation direction, for example (refer to FIG. 5). When the controller start signal is input to the controller 18, the motor 10 starts to rotate (that is, the table 7 and the object 2 to be inspected mounted on the table 7 start to rotate). When the object 2 to be inspected reaches the position at 0° in the relative rotation direction, the rotation speed of the motor 10 reaches a fixed speed, and the rotation speed of the object 2 to be inspected reaches a fixed speed.

In the present embodiment, the area sensor 4 acquires the X-ray image before the object 2 to be inspected reaches the position at 0° in the relative rotation direction, but the X-ray image acquired by the area sensor 4 after the object 2 to be inspected reaches the position at 0° in the relative rotation direction is used for generating the CT image. That is, when the object 2 to be inspected reaches the position at 0° in the relative rotation direction, the X-ray image for generating the CT image starts to be acquired. The CT image is generated based on the X-ray images that are acquired after the rotation speed of the motor 10 reaches a fixed speed (that is, after the rotation speed of the object 2 to be inspected reaches a fixed speed).

Main Effects of Present Embodiment

As described above, in the present embodiment, before starting to acquire the X-ray image used for generating the CT image and before the motor 10 is started, the area sensor 4 starts to acquire the X-ray image, and outputs the periodic acquisition timing signal indicating the timing for acquiring the X-ray image. In the present embodiment, the PLC 16 generates the motor start signal for starting the motor 10 based on the first signal generated from the acquisition timing signal and outputs the motor start signal to the start signal generation circuit 15.

Additionally, in the present embodiment, the start signal generation circuit 15 generates the controller start signal for causing the controller 18 to start to output the motor driving signal, and outputs the controller start signal to the controller 18 at the first output timing of the acquisition timing signal after receiving the motor start signal. That is, in the present embodiment, the start signal generation circuit 15 generates the controller start signal based on the acquisition timing signal and the motor start signal, and directly input the controller start signal to the controller 18. In the present embodiment, the motor 10 is started by directly inputting the controller start signal to the controller 18 from the start signal generation circuit 15.

Thus, in the present embodiment, delay and variations of the controller start signal can be suppressed as compared with a case in which the PLC 16 generates the controller start signal to be directly input to the controller 18, for example. As a result, the motor 10 can be always started at substantially the same timing as the output timing of the acquisition timing signal. In the present embodiment, the CT image is generated based on the X-ray images that are acquired after the rotation speed of the motor 10 reaches a fixed speed, the X-ray images used for generating the CT image are acquired by fixed periods corresponding to the clock signal generated inside the area sensor 4, and the motor 10 rotates at a fixed speed corresponding to the clock signal generated inside the controller 18 when the X-ray image used for generating the CT image is acquired.

Accordingly, in the present embodiment, even when the motor 10 is rotated at a relatively high speed (that is, even when the object 2 to be inspected is rotated at a relatively high speed), it is possible to suppress variations in the angle of the object 2 to be inspected in the relative rotation direction of the area sensor 4 with respect to the object 2 to be inspected at the time when each of the three X-ray images to be composited in the composite processing and used for generating the CT image is acquired. That is, in the present embodiment, it is possible to shorten the time for acquiring the X-ray image although it is possible to suppress variations in the angle of the object 2 to be inspected in the relative rotation direction of the area sensor 4 with respect to the object 2 to be inspected at the time when each of the three X-ray images to be composited in the composite processing and used for generating the CT image is acquired.

In the present embodiment, before generating the motor start signal, the PLC 16 generates the controller waiting signal for causing the controller 18 to be in the input waiting state for the controller start signal, and outputs the controller waiting signal to the controller 18. In the present embodiment, a condition for the controller 18 to output the motor driving signal is that the controller waiting signal has been input to the controller 18. Thus, in the present embodiment, it is possible to prevent a situation in which the controller 18 malfunctions due to influence of noise input to the controller 18, and erroneously starts to output the motor driving signal. Thus, in the present embodiment, it is possible to reliably cause the controller 18 to start to output the motor driving signal at the timing when the controller start signal is input.

(First Modification of Control Unit and Method for Starting Motor)

Figure 6:
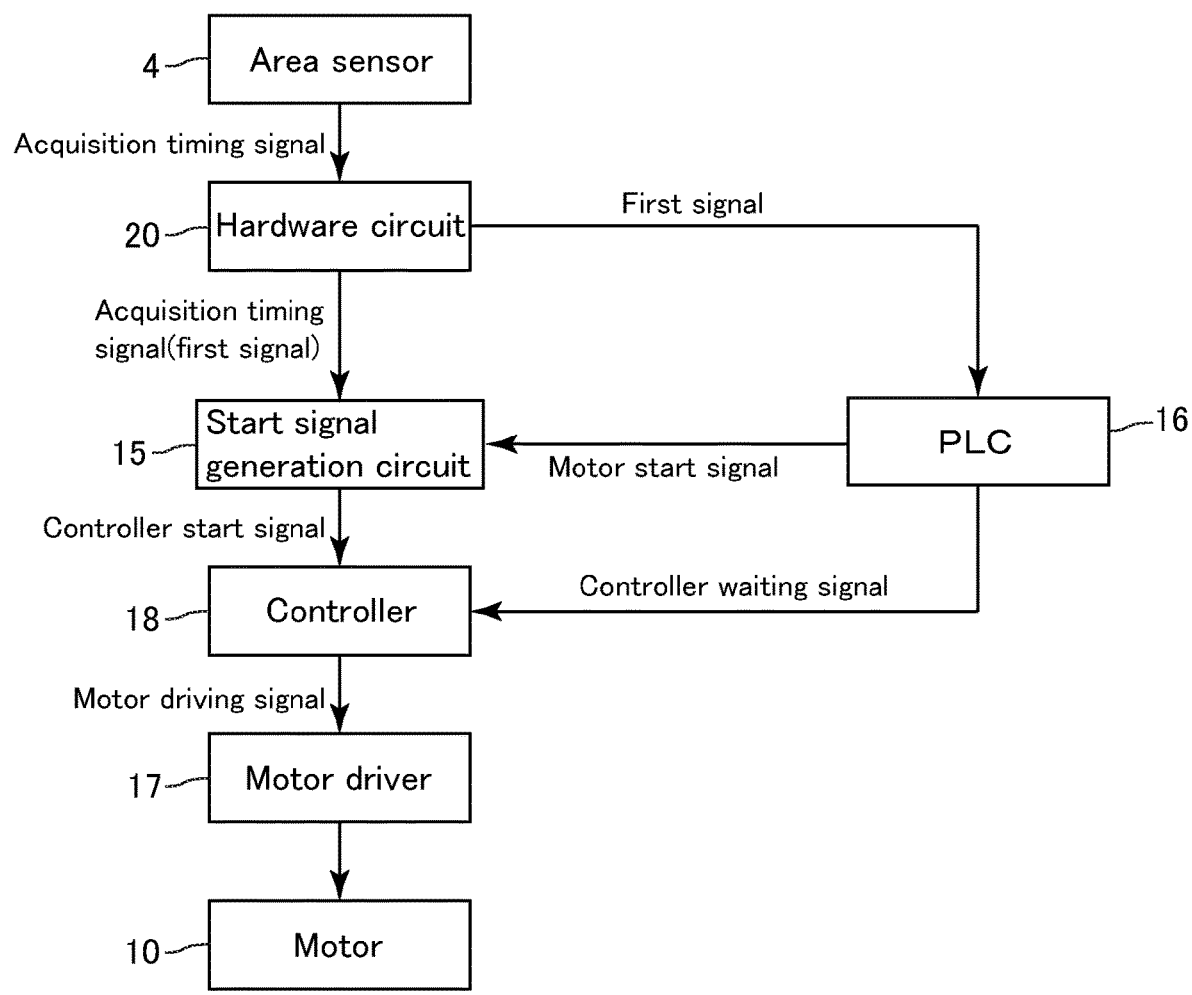
FIG. 6 is a block diagram for explaining a configuration of a control unit and a method for starting a motor according to another embodiment of the present invention.

FIG. 6 is a block diagram for explaining a configuration of the control unit 12 and a method for starting the motor 10 according to another embodiment of the present invention.

In the embodiment described above, the start signal generation circuit 15 does not necessarily generate the first signal. In this case, as illustrated in FIG. 6, the control unit 12 includes a hardware circuit 20 that generates the first signal based on the acquisition timing signal as hardware. In this modification, the area sensor 4 outputs the acquisition timing signal to the hardware circuit 20, and the hardware circuit 20 outputs the first signal to the PLC 16. For example, the acquisition timing signal is input to the start signal generation circuit 15 from the hardware circuit 20. Similarly to the embodiment described above, the start signal generation circuit 15 generates and outputs the controller start signal to the controller 18 at the first output timing of the acquisition timing signal after receiving the motor start signal.

In this modification, the acquisition timing signal may be directly input to the start signal generation circuit 15 from the area sensor 4. The first signal may be input to the start signal generation circuit 15 from the hardware circuit 20 in addition to the acquisition timing signal, or in place of the acquisition timing signal. In a case in which only the first signal is input to the start signal generation circuit 15 from the hardware circuit 20, the start signal generation circuit 15 generates and outputs the controller start signal to the controller 18 at a timing when the rising edge of the first signal is firstly detected after receiving the motor start signal. Even in this case, the start signal generation circuit 15 generates and outputs the controller start signal to the controller 18 at the first output timing of the acquisition timing signal after receiving the motor start signal.

(Second Modification of Control Unit and Method for Starting Motor)

Figure 7:
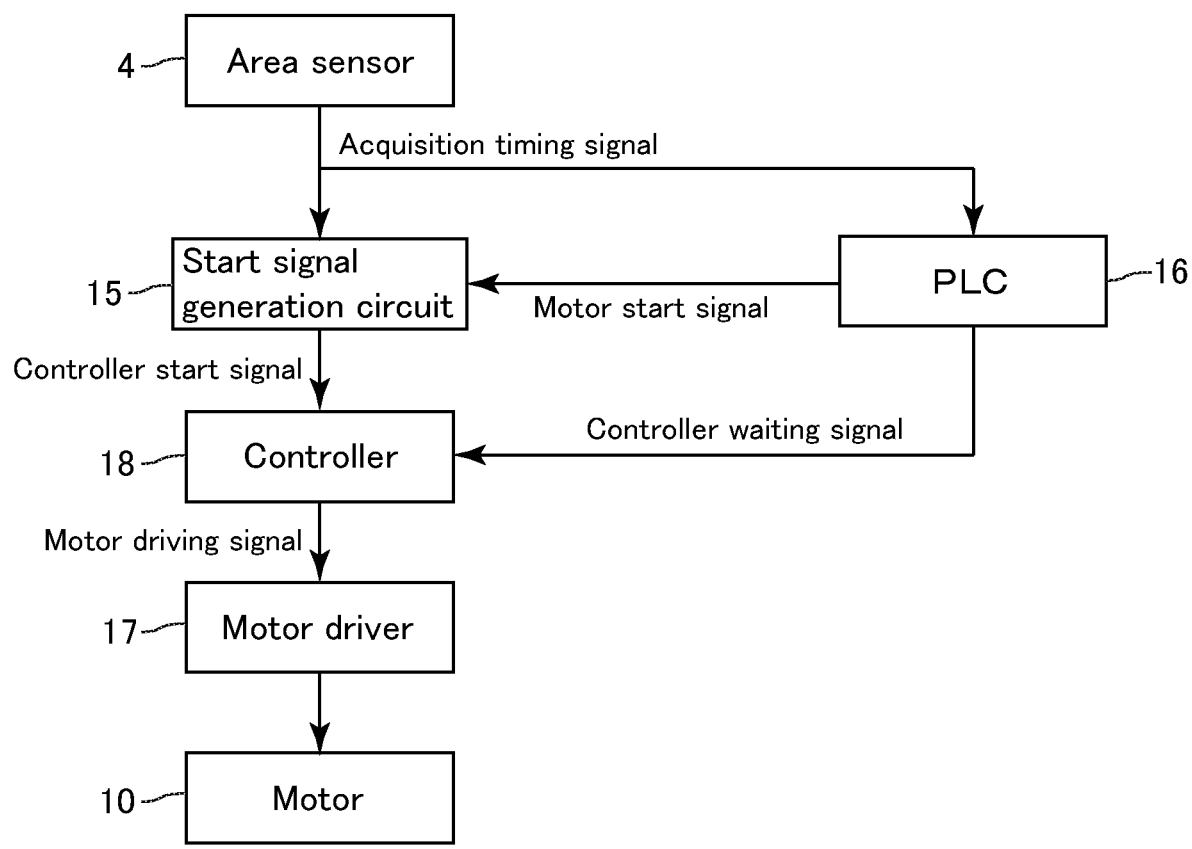
FIG. 7 is a block diagram for explaining a configuration of a control unit and a method for starting a motor according to another embodiment of the present invention.

FIG. 7 is a block diagram for explaining a configuration of the control unit 12 and a method for starting the motor 10 according to another embodiment of the present invention.

If the PLC 16 can process the acquisition timing signal in the modification illustrated in FIG. 6, the control unit 12 does not necessarily include the hardware circuit 20 as illustrated in FIG. 7. In this modification, the acquisition timing signal is input to the PLC 16. The PLC 16 generates the motor start signal based on the acquisition timing signal, and outputs the motor start signal to the start signal generation circuit 15.

In this modification, for example, the PLC 16 previously stores the number of reference signals equal to or larger than the number of acquisition timing signals after the acquisition timing signal starts to be input to the PLC 16 until the period of the acquisition timing signal is stabilized. The PLC 16 counts the number of acquisition timing signals after the acquisition timing signal starts to be input to the PLC 16, and when the counted number of acquisition timing signals reaches the number of reference signals, the PLC 16 generates and outputs the motor start signal to the start signal generation circuit 15. Similarly to the embodiment described above, the start signal generation circuit 15 generates and outputs the controller start signal to the controller 18 at the first output timing of the acquisition timing signal after receiving the motor start signal.

Other Embodiments

In the embodiment described above, in a case in which the signal voltage of the acquisition timing signal is a signal voltage suitable for processing by the PLC 16, the start signal generation circuit 15 may only extend the output time of the acquisition timing signal as hardware. In a case in which the output time of the acquisition timing signal is an output time of a signal suitable for processing by the PLC 16, the start signal generation circuit 15 may only amplify the acquisition timing signal as hardware.

In the embodiment described above, the PLC 16 may previously store the number of reference edges equal to or larger than the number of edges of the first signal after the first signal starts to be input to the PLC 16 until the period of the first signal is stabilized. In this case, the PLC 16 counts the number of edges of the first signal after the first signal starts to be input to the PLC 16, and when the counted number of edges of the first signal reaches the number of reference edges, the PLC 16 generates and outputs the motor start signal to the start signal generation circuit 15.

In the embodiment described above, the motor 10 may be a servomotor. However, according to the examinations by the present inventor, the motor 10 rotates at a fixed speed corresponding to the clock signal generated inside the controller 18 in a case in which the motor 10 is a stepping motor, which is open-loop controlled, so that, as compared with a case in which the motor 10 is a servomotor, which is feedback controlled, it is possible to effectively suppress variations in the angle of the object 2 to be inspected in the relative rotation direction of the area sensor 4 with respect to the object 2 to be inspected at the time when each of the three X-ray images to be composited and used for generating the CT image is acquired. Even when the motor 10 is a servomotor, it is possible to obtain the same effect as that in the case in which the motor 10 is a stepping motor so long as the servomotor allows torque control and speed control to be performed and has excellent fast responsiveness.

In the embodiment described above, the start signal generation circuit 15 does not necessarily generate the controller start signal at the first output timing of the acquisition timing signal after receiving the motor start signal. For example, the start signal generation circuit 15 may generate the controller start signal at the second output timing or the third output timing of the acquisition timing signal after receiving the motor start signal. In the embodiment described above, the PLC 16 does not necessarily generate the controller waiting signal.

In the embodiment described above, the first signal may be an on/off signal that is turned on at the output timing of the acquisition timing signal and turned off thereafter at the next output timing of the acquisition timing signal. That is, the period of the first signal may be a period that is two times the period of the acquisition timing signal. The period of the first signal may be a period that is an integral multiple of (for example, three times) the period of the acquisition timing signal.

In the embodiment described above, the PC 5 may perform division processing of dividing the composite X-ray image X1 in the upper and lower direction into a plurality of X-ray images having a belt shape, that is, belt-shaped X-ray images after the composite processing, and may perform CT image generation processing of generating the CT image by performing a predetermined arithmetic operation based on the belt-shaped X-ray images after the division processing. Similarly, the PC 5 may perform the division processing on the column of X-ray images P2 after the composite processing, or may perform the division processing on the column of X-ray images P3 after the composite processing. The division processing is performed in the same manner as the division processing disclosed in WO2017/203886 described above.

In the embodiment described above, the PC 5 may perform the division processing of dividing the column of X-ray images captured from the area sensor 4 into a plurality of images in the upper and lower direction (specifically, dividing each of the X-ray images in the upper and lower direction), may perform the composite processing of connecting the divided X-ray images in the right and left direction to be composited as a belt-shaped X-ray image per fixed angle in the rotation direction of the object 2 to be inspected after the division processing, the X-ray images at the same position in the upper and lower direction that are acquired at the same angle in the rotation direction of the object 2 to be inspected, and may perform the CT image generation processing of generating the CT image by performing a predetermined arithmetic operation based on the belt-shaped X-ray images over 360° at the same position in the upper and lower direction after the composite processing. The series of processing herein is performed in the same manner as the processing disclosed in WO2017/203886 described above.

In the embodiment described above, the detection face 4a of the area sensor 4 may be larger than the virtual projection image VI in the upper and lower direction and the right and left direction. In this case, for example, the object 2 to be inspected mounted on the table 7 is rotated once at a fixed speed, and the area sensor 4 performs an operation of continuously acquiring the X-ray images per fixed angle multiple times. Between respective operations, the motor 10 is temporarily stopped, and started again. In a case of performing this operation ten times, for example, the composite processing is performed per fixed angle in the relative rotation direction, the composite processing of overlapping, compositing, integrating, and averaging ten X-ray images that are acquired at the same angle in the relative rotation direction of the area sensor 4 with respect to the object 2 to be inspected among the X-ray images acquired in each operation.

In this case, ten X-ray images are overlapped, composited, integrated, and averaged, so that it is possible to reduce noise in the X-ray image after the composite processing. Thus, it is possible to improve accuracy of the CT image that is generated based on the X-ray images after the composite processing. Even in this case, it is possible to suppress variations in the angle of the object 2 to be inspected in the relative rotation direction of the area sensor 4 with respect to the object 2 to be inspected at the time when each of the ten X-ray images to be composited in the composite processing and used for generating the CT image is acquired, so that it is possible to improve accuracy of the X-ray image after the composite processing.

In the embodiment described above, the rotation mechanism 8 may rotate the X-ray generator 3 and the area sensor 4. In the embodiment described above, the movement mechanism 9 may translate the object 2 to be inspected in the upper and lower direction and the right and left direction. Furthermore, in the embodiment described above, the X-ray detector 4 may be a line sensor (one-dimensional X-ray detector). In the embodiment described above, the optical axis of the X-ray generator 3 may be tilted with respect to the horizontal direction.

The invention claimed is:

1. An X-ray inspection apparatus comprising:
    an X-ray generator;
    an X-ray detector that is placed to be opposed to the X-ray generator across an object to be inspected, the X-ray detector being configured to:
        repeatedly acquire a plurality of X-ray images of the object; and
        repeatedly output a periodic acquisition timing signal indicating a timing for acquiring each of the plurality of X-ray images, a CT image being formed based on a specific number of images of the plurality of X-ray images;
    a rotation mechanism including a motor, the rotation mechanism being configured to perform a rotation operation in which one of a set of the X-ray generator and the X-ray detector and the object is rotated relative to the other of the set of the X-ray generator and the X-ray detector and the object; and
    a controller configured to control the X-ray generator, the X-ray detector, and the rotation mechanism,
    wherein the controller is further configured to:
        cause the X-ray detector to start to acquire the plurality of X-ray images before the rotation mechanism performs the rotation operation;
        repeatedly receive the periodic acquisition timing signal from the X-ray detector;
        activate one of the periodic acquisition timing signal and a first signal, the first signal being generated based on the repeatedly received periodic acquisition timing signal, a signal level of the first signal being varied in response to a receiving timing of the repeatedly received periodic acquisition timing signal;
        generate a motor start signal for starting the motor based on the repeatedly received periodic acquisition timing signal when the controller activates the periodic acquisition timing signal;
        generate the motor start signal based on the first signal when the controller activates the first signal;
        start to generate a motor drive signal at a first receiving timing of the periodic acquisition timing signal after the controller generates the motor start signal; and
        drive the motor by the motor drive signal;
    the specific number of images of the plurality of X-ray images correspond to images acquired, by the X-ray detector, after the controller starts to generate the motor drive signal and a rotation speed of the motor reaches a fixed speed, and
    the CT image is generated based on the specific number of images of the plurality of X-ray images.

2. The X-ray inspection apparatus according to claim 1, wherein
    the controller is configured to generate the motor start signal only based on the first signal.

3. The X-ray inspection apparatus according to claim 2, wherein
    the controller is further configured to:
        generate the first signal when the controller receives every signal of the repeatedly received periodic acquisition timing signals;
        store a predetermined number of the generated first signals;
        count a detector signal number of the generated first signals; and
        generate the motor start signal when the controller determines that the counted detector signal number of the generated first signals reaches the predetermined number.

4. The X-ray inspection apparatus according to claim 3, wherein
    the controller is further configured to:
        generate a waiting signal when the controller receives receive the periodic acquisition timing signal from the X-ray detector or the first signal is generated; and
        generate the motor drive signal only under a condition in which the waiting signal has been generated, the controller is prevented to accidentally generate the motor drive signal in response to a noise due to the condition.

5. The X-ray inspection apparatus according to claim 3, wherein the motor is a stepping motor or a servomotor.

6. The X-ray inspection apparatus according to claim 3, further comprising:
   a movement mechanism including another motor, the movement mechanism is configured to perform a movement operation in which the X-ray detector moves on a plane that is divided into a plurality of areas in a matrix,
   wherein the X-ray detector is an area sensor, and
   the controller is further configured to control the another motor to repeatedly move the area sensor from one area to another area of the plurality of areas on the plane until the area sensor acquires a complete X-ray image of the object based on the plurality of X-ray images.

7. The X-ray inspection apparatus according to claim 2, wherein
   the controller is further configured to:
      generate a waiting signal when the controller receives receive the periodic acquisition timing signal from the X-ray detector or the first signal is generated; and
      generate the motor drive signal only under a condition in which the waiting signal has been generated,
   the controller is prevented to accidentally generate the motor drive signal in response to a noise due to the condition.

8. The X-ray inspection apparatus according to claim 2, wherein the motor is a stepping motor or a servomotor.

9. The X-ray inspection apparatus according to claim 2, further comprising:
   a movement mechanism including another motor, the movement mechanism is configured to perform a movement operation in which the X-ray detector moves on a plane that is divided into a plurality of areas in a matrix,
   wherein the X-ray detector is an area sensor, and
   the controller is further configured to control the another motor to repeatedly move the area sensor from one area to another area of the plurality of areas on the plane until the area sensor acquires a complete X-ray image of the object based on the plurality of X-ray images.

10. The X-ray inspection apparatus according to claim 1, wherein
    the controller is further configured to:
       generate a waiting signal when the controller receives the periodic acquisition timing signal from the X-ray detector or the first signal is generated; and
       generate the motor drive signal only under a condition in which the waiting signal has been generated,
    the controller is prevented to accidentally generate the motor drive signal in response to a noise due to the condition.

11. The X-ray inspection apparatus according to claim 1, wherein the motor is a stepping motor or a servomotor.

12. The X-ray inspection apparatus according to claim 1, further comprising:
    a movement mechanism including another motor, the movement mechanism is configured to perform a movement operation in which the X-ray detector moves on a plane that is divided into a plurality of areas in a matrix,
    wherein the X-ray detector is an area sensor, and
    the controller is further configured to control the another motor to repeatedly move the area sensor from one area to another area of the plurality of areas on the plane until the area sensor acquires a complete X-ray image of the object based on the plurality of X-ray images.

* * * * *